Patented Feb. 20, 1951

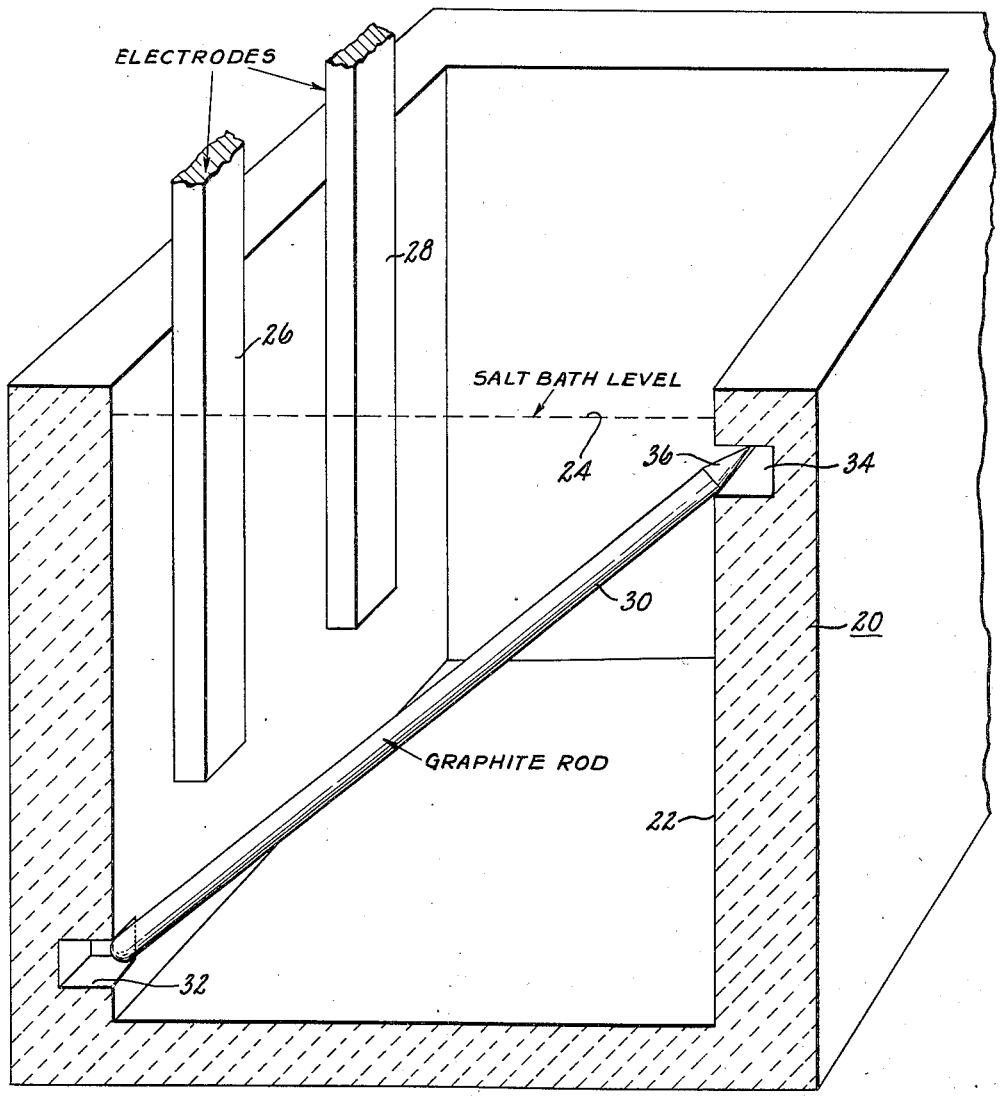

2,542,637

UNITED STATES PATENT OFFICE 2,542,637

METHOD OF RECTIFYING A NEUTRAL SALT HEAT-TREATING BATH

Stewart M. De Poy, Dayton, Ohio, assignor to General Motors Corporation, Detroit, Mich., a corporation of Delaware Application May 10, 1946, Serial No. 668,821

4 Claims. (Cl. 148—15)

This invention relates to a method for reducing oxides in neutral heat treating baths containing molten salts.

It is therefore an object of the invention to provide a method for reducing oxides in molten salt baths used in the heat treatment of steels and the like.

In carrying out the above object, it is a further object to position a graphite or carbon rod in the bath, which rod causes reduction of metal oxides in the bath and simultaneously acts as a scavenger in the bath for picking up the metals per se whereby the bath is maintained substantially free of oxides or other inclusions.

A still further object of the invention is to provide a method of rectification of molten salt baths wherein the bath is maintained in a state of relatively high purity for increasing the life of the electrodes and improving the action of the bath.

In carrying out the above object, it is still a further object to provide a method whereby carbon pick-up in the bath is reduced so that high speed steels and the like have substantially no carbon losses when treated in the bath.

Further objects and advantages of the present invention will be apparent from the following description, reference being had to the attached sheet of drawings which show a section through a typical heat treating bath.

Heat treatment of steels, such as, high speed steels in molten salt baths has many advantages. First, more even temperature control can be obtained and maintained than is usually practical when using atmosphere type furnaces. Further, the molten salt bath prevents any oxidation of the steel which is often experienced in atmosphere type furnaces, due to leaks, etc., occuring in the furnace.

One disadvantage of the usual molten salt heat treating bath is the carbon pick-up of the bath which causes decarburization of the surface of the steel. Thus any steel which is susceptible to decarburization is difficult to heat treat in a molten salt bath with satisfactory results unless some expedient is used to prevent the decarburization.

The use of silica in controlled quantities within the bath has been found to be a satisfactory method for reducing the decarburization of objects being heat treated therein but this silica addition has a deleterious effect on the electrodes and also forms a slude which accumulates at the bottom of the pot and requires frequent renewal of the salt. The action of the silica on the electrodes is not economical, since electrodes are eaten away rapidly and necessitate frequent replacement. Other methods for preventing decarburization are known but in each and every one of these methods sludges are formed which necessitate frequent renewal of the bath.

I have found that a satisfactory method may be practiced by the use of a solid graphite or carbon rod immersed in the bath, which rod reduces metal oxides in the bath and acts as a scavenger for metals in solution whereby the rod may be periodically removed, cleaned and replaced. The use of the graphite rod has no deleterious effect whatsoever on the electrodes and no sludge is formed in the bath. Thus, the life of the molten salt bath is greatly increased as is the life of the electrodes whereby a more economical heat treating method is obtained. Similarly the action on the parts to be heat treated is negligible from point of decarburization whereby no soft outer skin is formed since the carbon pick-up of the bath is less than has been experienced by the use of any other method.

Specifically referring to the drawing, a cross section of a refractory type pot 20 is shown, which pot includes an internal reservoir 22 of rectangular cross section. The salt bath level is indicated at 24 and this salt is heated by means of electrodes 26 and 28 immersed in the bath. The electrodes are connected to a suitable current source not shown. The graphite rod used as a metal pick-up and oxide reducer, is shown at 30. One means of positioning the rod in the pot is to form notches or indentations of the walls of the pot as at 32 and 34. The rod 30 is preferably pointed at 36 and may be backed up into the indentation 32 and then the point 36 thereof inserted in indentation 34 whereupon the rod is maintained in place. Obviously, the rod may be immersed in the salt bath by any satisfactory expedient whereby easy removal for cleaning purposes may be effected, the embodiment shown being merely one of the many expedients which may be used.

The salt bath may be any suitable type of neutral salt which normally causes decarburization of the steel such as, barium chloride, barium chloride and sodium chloride, barium chloride and potassium chloride, etc. The bath is usually heated to temperatures of from 1750 to 2400° F. for average heat treatment on high speed type steels. The present bath is particularly desirable with molybdenum type steels since the steel may be hardened without any substantial molybdenum distillation, or loss.

Three baths checked over long periods of time for life of electrodes and decarburization of steels being treated and condition of baths gave the following results:

TEST #I

*Bath with no rectifier added*

[Temperature of bath, 2,225° F. Original carbon content, .84% (test piece). Average electrode life, 2,650 hours.]

| Age of Bath | Soaking Time of Test Piece | Carbon Content in Outside Layer | Loss of Carbon | Decarburization Index |
|---|---|---|---|---|
| Hours | Minutes | Per cent | | |
| 240 | 5 | .76 | .08 | 9.5 |
| 240 | 10 | .75 | .09 | 10.7 |
| 240 | 15 | .60 | .24 | 28.6 |
| 494 | 5 | .73 | .11 | 13.1 |
| 662 | 15 | .52 | .32 | 38.1 |

TEST #II

*Bath with silica rectifier (2 oz. of $SiO_2$ for 24 hours)*

[Original carbon content, .86% (test piece). Operating temperature 2,225° F. Average electrode life, 720 hours.]

| Age of Bath | Soaking Time of Test Piece | Carbon Content in Outside Layer | Loss of Carbon | Decarburization Index |
|---|---|---|---|---|
| Hours | Minutes | Per cent | | |
| 264 | 5 | .82 | .04 | 4.7 |
| 264 | 10 | .80 | .06 | 7.0 |
| 264 | 15 | .74 | .12 | 14.0 |
| 504 | 5 | .78 | .08 | 9.3 |
| 576 | 5 | .77 | .09 | 10.5 |
| 912 | 5 | .74 | .12 | 13.5 |
| 1,416 | 5 | .72 | .14 | 16.3 |
| 1,416 | 15 | .64 | .22 | 25.3 |

TEST #III

*Bath with graphite rod rectifier*

[Original carbon content, .80% (test piece). Operating temperature 2,225° F. Average electrode life, 3,000 hours (electrode still useable).]

| Age of Bath | Soaking Time of Test Piece | Carbon Content in Outside Layer | Loss of Carbon | Decarburization Index |
|---|---|---|---|---|
| Hours | Minutes | Per cent | | |
| 240 | 5 | .80 | 0.00 | 0 |
| 240 | 10 | .78 | 0.02 | 2.5 |
| 240 | 15 | .77 | 0.03 | 3.75 |
| 480 | 5 | .79 | 0.01 | 1.25 |
| 672 | 5 | .79 | 0.01 | 1.25 |
| 960 | 5 | .78 | 0.02 | 2.5 |
| 1,344 | 5 | .78 | 0.02 | 2.5 |
| 1,344 | 15 | .76 | 0.04 | 5.0 |

In all of the above tests similar types of steel were used, although the carbon content as originally noted in the identified layer varied slightly. In all cases, the salt bath contained 95% barium chloride with about 5% sodium chloride. All tests were run in the same furnaces under similar conditions other than the specific variations noted.

From the results of these tests, it is apparent that no rectifier as noted in Test #I, the electrode stood up well enough but the decarburization index was high indicating marked carbon loss at the outer skin of the test piece. When the silicon dioxide rectifier was used, the decarburization index was lower and the loss of carbon lower in the outside layer. However the electrodes were eaten away in a comparatively short space of time and as previously stated, a sludge built up in the salt bath which required renewal of the bath or frequent cleaning thereof. When using a graphite rod, all of the aforementioned difficulties were eliminated in that the carbon index was maintained at a relatively low figure, the carbon loss at no time was excessive and the electrodes even after three thousand hours were still in useable condition.

From these tests, it is apparent that the use of the carbon rod greatly improves the operation of the bath both from an operational and an economical standpoint.

With respect to the area of graphite rod in a pot, this is best derived at by checking the decarburization index, although I have found that in a bath 16 by 16 by 21 inches deep that a 2 inch diameter rod 23 inches long is very satisfactory as is noted in test number 3.

Another set of tests was run to show the hardness at the varying depths from the surface of the piece and at the core thereof. The hardness is also an index of the decarburization.

These tests are as follows:

| Age of Bath- Hours | Soaking Time of Piece- Minutes | Rectified By | Vickers Hardness | | | |
|---|---|---|---|---|---|---|
| | | | .0007" From Surface | .0012" From Surface | .003" From Surface | Core |
| 360 | 5 | None | 479 | 479 | 556 | 776 |
| 590 | 5 | do | 428 | 465 | 573 | 775 |
| 662 | 5 | do | 396 | 406 | 406 | 780 |
| 384 | 5 | $SiO_2$ | 523 | 630 | 717 | 787 |
| 576 | 5 | do | 493 | 611 | 717 | 785 |
| 744 | 5 | do | 465 | 479 | 650 | 888 |
| 1,416 | 5 | do | 440 | 440 | 493 | 905 |
| 1,416 | 10 | do | 417 | 465 | 523 | 935 |
| 480 | 5 | Graphite | 785 | 785 | 775 | 798 |
| 672 | 5 | do | 850 | 873 | 888 | 908 |
| 960 | 5 | do | 935 | 935 | 935 | 935 |
| 1,344 | 5 | do | 935 | 935 | 935 | 935 |
| 1,344 | 10 | do | 935 | 880 | 905 | 935 |
| 2,000 | 5 | do | 880 | 880 | 852 | 880 |
| 2,000 | 10 | do | 793 | 822 | 830 | 880 |

As mentioned hereinbefore, as the reduction of oxides progresses a metal pick-up is experienced on the graphite rod and about every three to four hours the rod should be cleaned, that is the metal scraped off, for maintaining the efficiency of the scavenging and deoxidizing effects.

While the embodiments of the present invention as herein disclosed, constitute preferred forms, it is to be understood that other forms might be adopted, all coming within the scope of the claims which follow.

What is claimed is as follows:

1. The steps in the method of rectifying a heat treating bath which will normally decarburize the steel being heat treated therein, comprising; providing a molten salt bath which is heated by metal electrodes immersed therein, immersing a solid graphite scavenging rod in said salt bath for reducing metal oxides therein during the heat treating process and for collecting metals thereon, and periodically removing said scavenging rod from the bath and cleaning the metals therefrom and then replacing the cleaned rod in the bath.

2. The steps in the method of rectifying a neutral salt heat treating bath that will normally decarburize carbon-bearing steels being heat treated therein, comprising; providing a molten salt bath that is heated by metal electrodes immersed therein, immersing a graphite rod therein, reducing metal oxides in the bath during the heat treating process through contact thereof with said graphite rod, simultaneously collecting the reduced metals on the rod, and periodically removing the rod with the reduced metals thereon and replacing it with a graphite rod free of metals whereby continued rectification of the bath will occur.

3. In the method of rectifying a neutral salt heat treating bath heated by metal electrodes and simultaneously maintaining the oxide content thereof at a point below that which will decarburize the surface of the steel being heat treated therein, the steps comprising; reducing metal oxides in the molten salt bath during the heat treating process by means of a solid graphite rod immersed in said bath, collecting reduced metals on the graphite rod for scavenging the bath, periodically removing the graphite rod from the bath and cleaning said reduced metals from said graphite rod and then replacing the graphite rod in the bath.

4. In a method of rectifying a neutral salt heat treating bath heated by metal electrodes and simultaneously maintaining the oxide content of the bath at a point below that which will decarburize the surface of the steel being heat treated therein, the steps comprising; reducing metal oxides in the molten salt bath during the heat treating process by means of a solid graphite rod immersed in said bath, collecting reduced metals on the surface of said graphite rod for scavenging the bath for maintaining the bath substantially clean of metal oxides, and periodically removing the rod, cleaning said reduced metals from the surface thereof, and replacing the rod in the bath.

STEWART M. DE POY.

REFERENCES CITED

The following references are of record in the file of this patent:

UNITED STATES PATENTS

| Number | Name | Date |
| --- | --- | --- |
| 1,799,945 | Beck | Apr. 7, 1931 |
| 1,876,732 | Neuhauss | Sept. 13, 1932 |
| 2,349,767 | Solakian et al. | May 23, 1941 |

FOREIGN PATENTS

| Number | Country | Date |
| --- | --- | --- |
| 14,479 | Great Britain | June 27, 1905 |

OTHER REFERENCES

"Molten Salt Baths," page 50, published by E. I. du Pont de Nemours & Co., Inc., 1946.